UNITED STATES PATENT OFFICE

Patented July 18, 1933 — 1,918,461

WILHELM ECKERT, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

DYESTUFF DERIVED FROM 1-8-NAPHTHALIC ACID ANHYDRIDE

No Drawing. Application filed May 22, 1930, Serial No. 454,837, and in Germany December 10, 1929.

The present invention relates to the new compounds of the general formula:

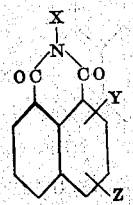

wherein X represents a hydroaryl group or an amino group which may be substituted and Y stands either for an amino group, in which case Z represents a sulfonic acid group, or hydrogen, or for a sulfamic acid group, in which case Z represents hydrogen.

My invention also comprises such compounds of the above given general formula as are substituted in the naphthalene nucleus by such monovalent substituents as, for instance, the nitro group or halogen.

My new compounds are obtainable by causing such an amino compound of the hydroaromatic series or such a hydrazine compound as contains at least one reactive hydrogen atom in an amino group to react with a compound of the following general formula:

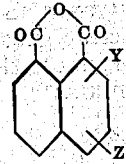

wherein Y and Z have the above given designation.

In my process one can use, instead of the naphthalic acid anhydride compounds of the above given general formula, the corresponding 1-8-naphthalene dicarboxylic acid compounds.

My process is preferably carried out by causing the compounds to act upon each other in the presence of water at a temperature of about 100° C. The heating may also be carried out in an autoclave.

Such of my new compounds as contain a sulfonic acid group or a sulfamic group are well suited for use as acid wool dyestuffs. On the other hand such as contain an amino group or a sulfamic group in the absence of a nuclear substituted sulfonic acid group are well suited for dyeing cellulose esters or ethers.

The following examples illustrate the invention, but they are not intended to limit it thereto, the parts being by weight:

(1) 25 parts of 4-amino-sulfo-1-8-naphthalic acid anhydride are heated to boiling with 25 parts of hydrazine hydrate and 300 parts of water for some hours. After cooling the dyestuff thus obtained is precipitated, filtered by suction and dried.

The dyestuff is a powder of an intense yellow color which is soluble in water and dyes animal fibers in an acid bath a very clear greenish-yellow even tint.

(2) When using in Example 1, instead of hydrazine hydrate, phenylhydrazine, there is obtained a dyestuff having properties similar to those of the product obtainable according to that example, but of a little more reddish tint.

(3) 15 parts of 4-amino-sulfo-1-8-naphthalic acid anhydride and 40 parts of cyclohexylamine are heated to gently boiling with 120 parts of water for about 5 hours. The excess of cyclohexylamine is expelled by means of superheated steam and the dyestuff is salted out from the filtrate, filtered by suction and dried. It dyes animal fibers in an acid bath a very even clear greenish-yellow tint.

(4) 10 parts of 4-amino-1-8-naphthalic acid cyclohexylimide of the following formula:

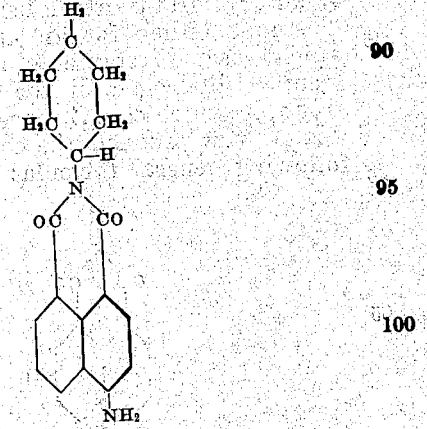

(yellow prisms melting at about 242° C.) prepared for instance by condensing 4-amino-naphthalic acid anhydride with cyclohexylamine are heated with fuming sulfuric acid of 20 per cent strength in a steam bath for a short time. When a test portion taken from the mass has become soluble in water, the mass is poured into water and the dyestuff is salted out in the usual manner. The dyestuff thus formed has the same tinctorial properties as that obtainable according to Example 3.

(5) 20 parts of sulfo-4-amino-1-8-naphthalic acid anhydride and 20 parts of p-cyclohexylaniline of the following formula:

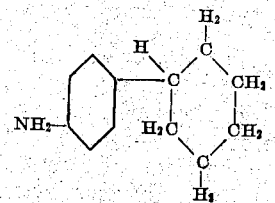

are heated, while stirring, to about 100° C.–110° C. for some hours with 250 parts of water in an autoclave. When the condensation is finished, the excess of p-cyclohexylaniline is neutralized by means of dilute hydrochloric acid and the dyestuff thus obtained is salted out in the usual manner.

The condensation may also be carried out by heating without using an autoclave. The dyestuff dyes animal fibers in an acid bath a very clear yellow tint.

I claim:

1. As new products the compounds of the following general formula:

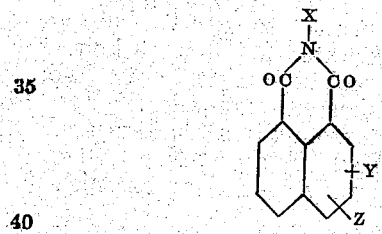

wherein X represents a hydroaryl group or an amino group which may be substituted by an aryl group of the benzene series and Y stands either for an amino group, in which case Z represents a sulfonic acid group or hydrogen, or for a sulfamic acid group, in which case Z represents hydrogen.

2. As new products the compounds of the following general formula:

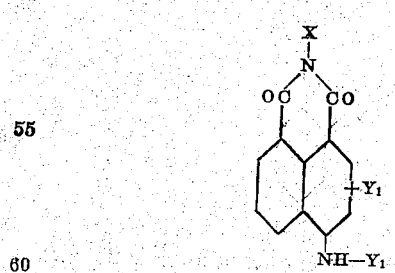

wherein X represents a hydroaryl group or an amino group which may be substituted by an aryl group of the benzene series, one $Y_1$ stands for a sulfonic acid group, the other $Y_1$ for hydrogen.

3. As a new product the compound of the following formula:

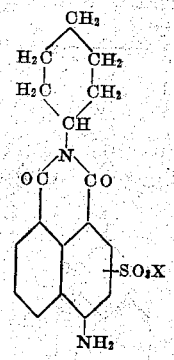

wherein X represents hydrogen or a metal, being an intensely yellow colored powder, dissolving in water to a yellow solution having a weak greenish fluorescence and dyeing animal fibers in an acid bath a brilliant clear yellow very even tint.

4. As a new product, the compound of the following formula:

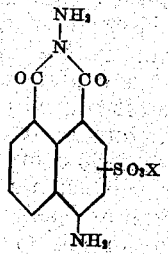

wherein X represents hydrogen or a metal, being an intensely colored yellow powder, soluble in water, dyeing animal fibers in an acid bath a very clear greenish-yellow tint.

5. As a new product, the compound of the following formula:

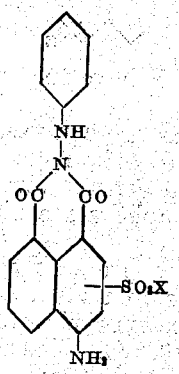

wherein X represents hydrogen or a metal, being an intensely yellow colored powder, soluble in water, dyeing animal fibers in an acid bath a very clear yellow even tint.

WILHELM ECKERT.